United States Patent [19]

Bruch

[11] Patent Number: 4,818,057
[45] Date of Patent: Apr. 4, 1989

[54] AN APPARATUS FOR FIXING LIGHT WAVEGUIDE CABLES IN A PLUG HOUSING

[75] Inventor: Helmut Bruch, Berlin, Fed. Rep. of Germany

[73] Assignee: Siemens Aktiengesellschaft, Berlin and Munich, Fed. Rep. of Germany

[21] Appl. No.: 119,720

[22] Filed: Nov. 12, 1987

[30] Foreign Application Priority Data

Nov. 12, 1986 [DE] Fed. Rep. of Germany ....... 8630246

[51] Int. Cl.⁴ .............................................. G02B 6/36
[52] U.S. Cl. ................................................. 350/96.20
[58] Field of Search ................ 350/96.20, 96.21, 96.22

[56] References Cited

U.S. PATENT DOCUMENTS

| 4,114,979 | 9/1978 | Heldt | 350/96.21 |
| 4,279,468 | 7/1981 | Turley et al. | 350/96.21 |
| 4,534,617 | 8/1985 | Kloots et al. | 350/96.20 |
| 4,679,895 | 7/1987 | Huber | 350/96.20 |
| 4,708,428 | 10/1987 | Loeffler et al. | 350/96.20 |
| 4,730,890 | 3/1988 | Kashimura et al. | 350/96.20 |
| 4,773,726 | 9/1988 | Ito | 350/96.20 |

FOREIGN PATENT DOCUMENTS 0065404 4/1983 Japan ................................ 350/96.20

Primary Examiner—William L. Sikes
Assistant Examiner—Xuan T. Vo
Attorney, Agent, or Firm—Hill, Van Santen, Steadman & Simpson

[57] ABSTRACT

A plug housing for receiving an optical fiber cable having independent arrangements for gripping the jacket of the cable, wrapping and gripping the reinforcement elements of the cable, and for gripping the optical fibers of the cable, each of these arrangements is independently mounted within the housing so that each can be separately manipulated. In addition, these arrangements are each received in the housing without deforming a portion of the housing.

10 Claims, 4 Drawing Sheets

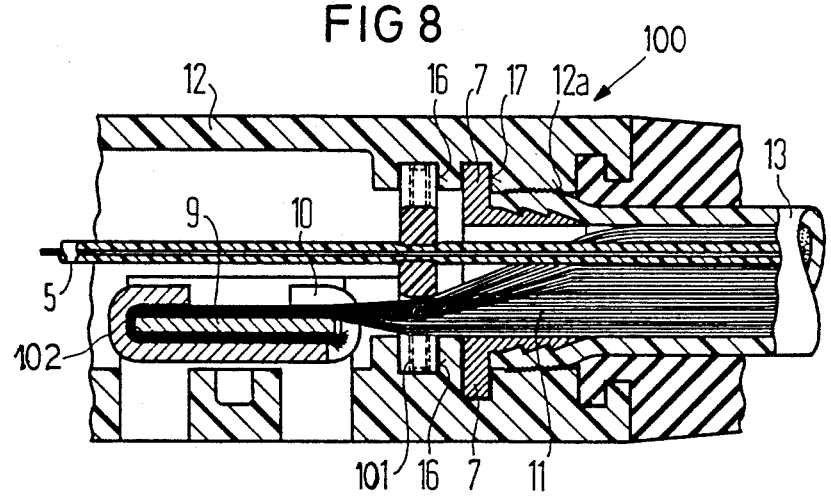
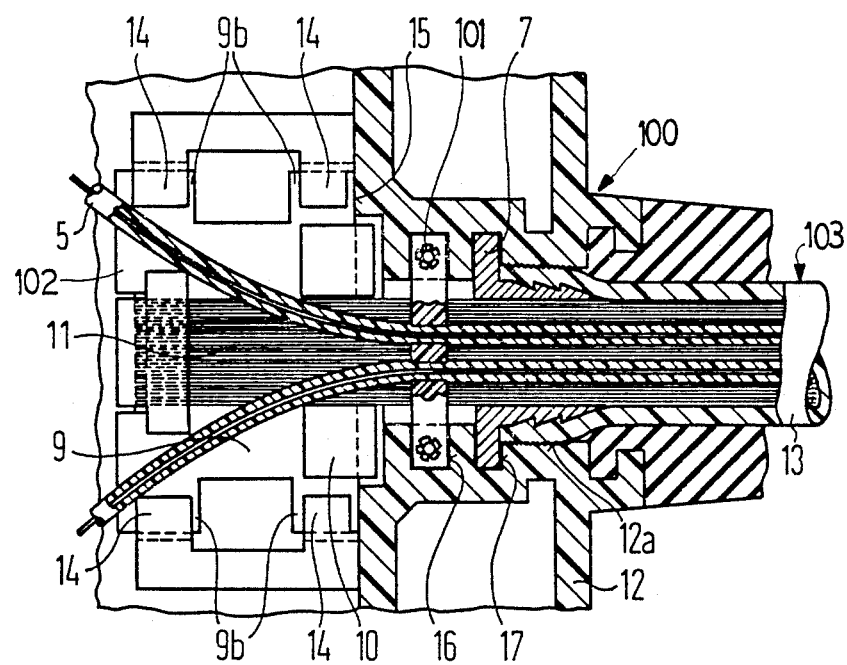

AN APPARATUS FOR FIXING LIGHT WAVEGUIDE CABLES IN A PLUG HOUSING

BACKGROUND OF THE INVENTION

The present invention is directed to an apparatus for securing a light waveguide cable in a plug housing, which housing has a through-opening for passing at least one light waveguide cable therethrough.

Numerous methods are known for fixing individual components of light waveguide cables which are composed, namely, of an actual light waveguide, reinforcing element in the form of Kevlar strands and a cable cladding or jacket.

U.S. Pat. No. 4,114,979 discloses a method for fixing the reinforcing strands, which are Kevlar strands, and for fixing the cladding at a plug housing. The disadvantage of this known solution is that it is essentially irreversible. It has been shown in practice that it can become necessary, under certain conditions, to be able to release the connection between the light waveguide cable and the plug housing itself.

SUMMARY OF THE INVENTION

The object of the present invention is to create an apparatus for fixing light waveguide cables in a plug housing, which has a through-opening for conducting at least one light waveguide cable through the housing, which improved apparatus makes it possible, first, to design the fixings or mountings to be releasable and, secondly, to be able to separately manipulate the individual elements of the light waveguide cable until these individual elements are fixed in the desired position.

To accomplish these goals, the present invention is directed to an improvement in an apparatus for fixing a light waveguide cable in a plug housing. These improvements include the plug housing being formed of two housing parts having a parting plane that extends parallel to an entry axis for the light waveguide, first means for supporting a light waveguide cable jacket, second means for supporting a reinforcing element, third means for supporting the at least one fiber-like light waveguide with the first, second and third means being formed of individual elements which are separably manipulatable parts and are releasably connected to the cable elements, such as the cladding, reinforcing elements and fiber-like waveguides. The elements forming the first, second and third parts are received in various recesses, which are formed in the housing parts and extend transversely through the parting plane to be held in both parts.

The second means for receiving the reinforcing elements, which are preferably strands of Kevlar, includes a plate on which the Kevlar reinforcement elements can be wrapped and a pinch element which is crimped on the wrapped plate. The first means for supporting the light waveguide cable jacket preferably includes a hollow, cylindrical sleeve with a flange at one end that can be pushed under the jacket with the end of the jacket or cladding engaging the flange. The outside surface of the sleeve is preferably formed with means to prevent slipping, such as teeth or grooves or some structure that will prevent sliding of the jacket off of the sleeve. In addition, the parts of the housing have recesses for receiving the sleeve and the region of the recess surrounding the sleeve is provided with a surface structure similar to that of the sleeve.

The third means for supporting the waveguide is preferably composed of two identical halves or members, with each half having a bore at one end and a pin at the opposite end and a pinch means including at least one groove interposed therebetween. The two halves are joined together with the pin inserted in the socket and the grooves coacting to form a grip of a waveguide. The pin and bore of each of the halves is constructed so that when the pin of one half is inserted in the bore of the other a press fit is formed.

BRIEF DESCRIPTION OF THE DRAWINGS

FIG. 8 is a vertical cross sectional view illustrating a housing part showing recesses for receiving the members of FIGS. 2, the assembly of FIG. 6, and the gripping element of FIG. 7; and FIG. 9 is a horizontal cross sectional view of the housing of FIG. 8.

DESCRIPTION OF THE PREFERRED EMBODIMENTS

Figure 1:
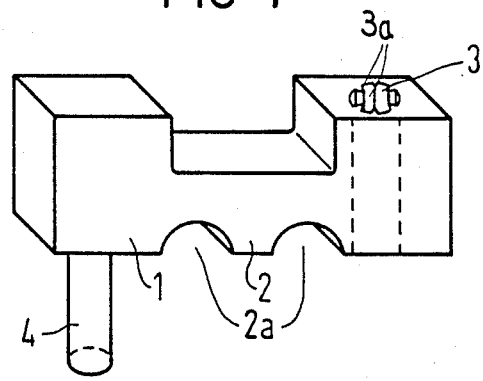
FIG. 1 is a perspective view of a member for forming half of a clamping mechanism for a fiber-like waveguide.

The principles of the present invention are particularly useful when incorporated in an apparatus generally indicated at 100 in FIGS. 8 and 9 for fixing a light waveguide cable 103 in a plug housing.

As illustrated, the apparatus 100 has a housing 12 which receives a waveguide clamping arrangement 101, a reinforcing element clamping arrangement or means 102 and an arrangement including a sleeve 7 for gripping a cladding or jacket 13 of the cable 103.

Figure 2:
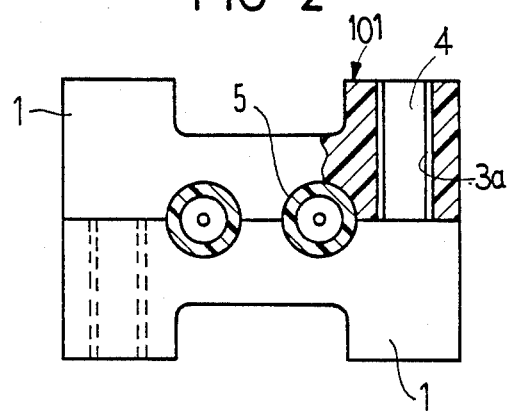
FIG. 2 is an end view with portions broken away for purposes of illustration showing two members of FIG. 1 joined together to clamp a pair of fibers.
Figure 3:
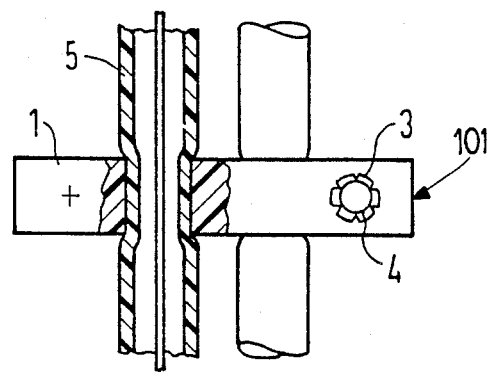
FIG. 3 is a top view with portions broken away for purposes of illustration showing the arrangement of FIG. 2.

The waveguide clamping arrangement 101 is best illustrated in FIGS. 1 and 2 includes two members 1 which are identical clamp parts. Each part 1 has a pinch beam 2 extending between two grooves 2a. At one end of the member or part 1, a bore 3 is provided, which extends transverse to the member and to the grooves 2a. At the other end, a pin 4, which extends parallel to the bore 3 is provided. Two of the members 1 are joined together with the pin 4 of one member inserted in the bore 3 of the other member, as illustrated in FIG. 2. In so doing, fiber-like waveguides 5 are received in the coacting grooves 2a and are compressed or pinched, as best illustrated in FIG. 3. The bores 3 are illustrated as having axially-extending projections or ribs 3a so that a press fit will occur when the pin 4 is inserted into the bore.

Figure 4:
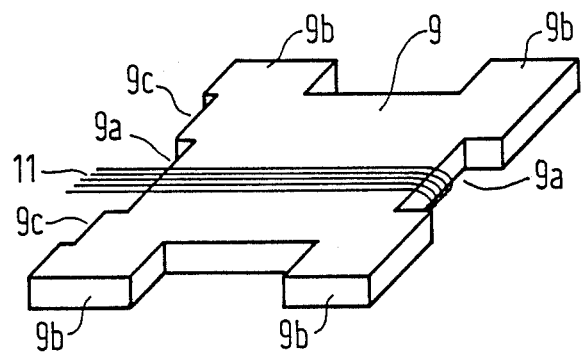
FIG. 4 is a perspective view of a plate on which fibers are wrapped.

The waveguide cable 103 of FIG. 9 is provided with reinforcing elements 11, which are preferably strands of Kevlar. In order to provide means 102 for releasably holding, supporting and winding the strands 11, a plate 9 and a pinch plate 10 are provided. As best illustrated in FIG. 4, the plate 9 has recesses 9a on opposite sides, with one of the recesses 9a also having a larger adjacent recess 9c. In addition, the plate has projection or tabs 9b. An end portion of the Kevlar reinforcement strands, such as 11, are stripped from the cable cladding and are combined to form a skein and are placed around the winding panel or plate 9. As illustrated, they are wound in the area of the recesses 9a, which will prevent lateral sliding of the elements 11 along the plate.

Figure 5:
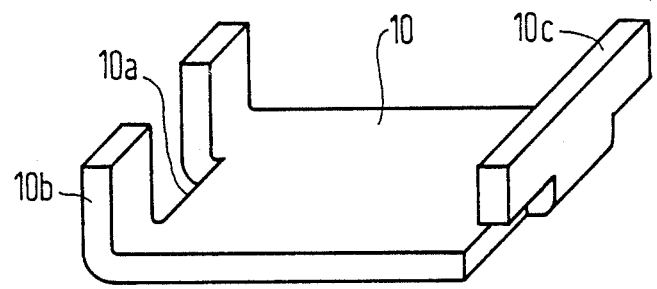
FIG. 5 is a perspective view of a pinch element that cooperates with the plate of FIG. 4 to grip the fibers wrapped on the plate of FIG. 4.

The pinch element 10 (FIG. 5), along one side, has a pair of upstanding projections or tabs 10b, which form a recess 10a. Opposite the side with the recess 10a is a T-shaped tab 10c. The recess 10a is approximately the same size as the recess 9a of the plate 9. The width of the plate 10 is such that the two tabs 10b can be received in the recess 9c when the plate 9 is inserted on the pinch plate 10. Thus, with the transverse dimensions of the recess 10a roughly coinciding with the recess 9a, the plate is inserted with the recess 9a overlapping the recess 10a.

Figure 6:
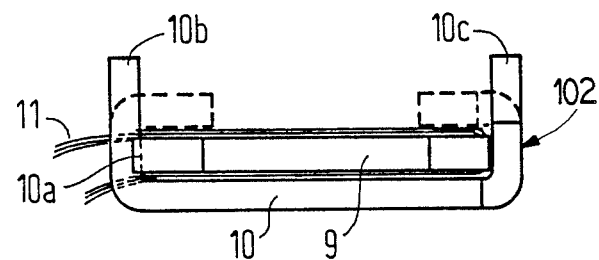
FIG. 6 is an end view of the plate of FIG. 4 being inserted on the pinch member of FIG. 5 with the tabs in bold solid lines showing the tabs at the time of assembly and the broken lines position of the tabs when crimped onto the plate.

As illustrated in FIG. 6, the winding panel 9, which is wrapped with the skeins 11, is placed on the part 10 so that the angled pinch tabs 10b are in the recess 9c and the skeins are directed toward the cable and are in the recess 10a. Subsequent thereto, the tabs 10b and 10c are pressed against the winding panel 9, in the way indicated in broken lines, so that the reinforcement elements are pinched between the panel 9 and the part 10, and also between the tab 10c and the panel 9.

Figure 7:
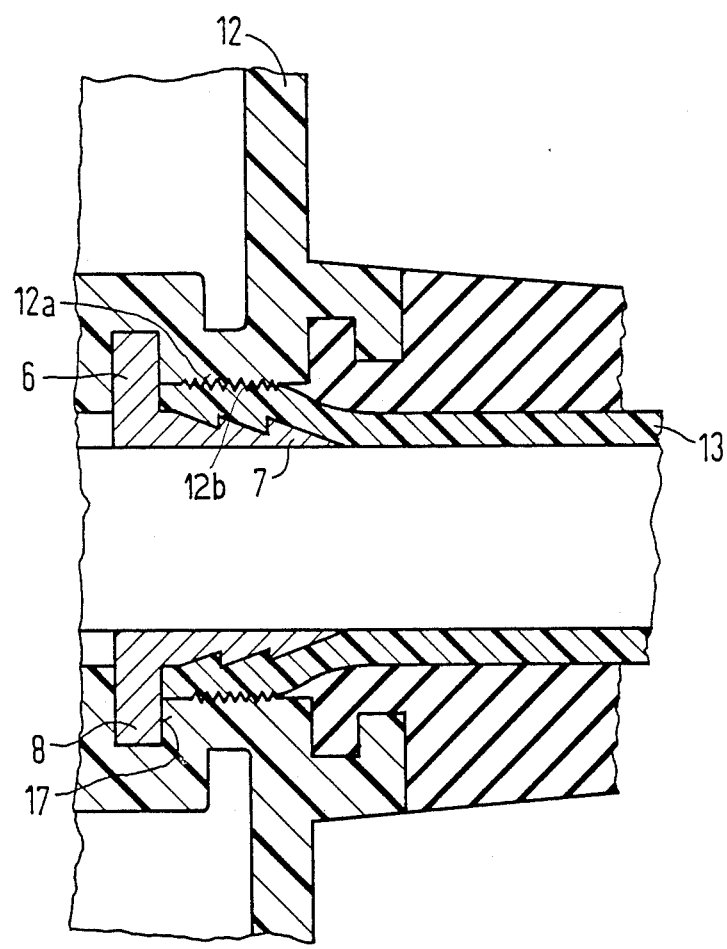
FIG. 7 is a partial cross sectional view of a housing with an arrangement for gripping the outer sheath or jacket of the cable.

As best illustrated in FIG. 7, the means for supporting the cable cladding 13 includes a hollow, cylindrical sleeve 6, which is inserted between the cable cladding or sheath 13 and the reinforcement elements 11. The outside surface of the sleeve 6 has a plurality of teeth 7 serving as barbs. The diameter of the sleeve is dimensioned so that the cable cladding 13 is elastically widened or spread and, thus, the teeth will engage the inner surface of the spread-apart cladding or jacket 13. This gripping will advantageously prevent the sliding of the cladding 13. As also illustrated in FIG. 7, the sleeve has an annular flange 8. The sleeve 6 is inserted in a housing recess 12a, which extends transverse to the direction of the cable. As illustrated, the recess 12a has a tooth surface portion 12b for gripping an outer surface of the cladding 13. The recess 12a is dimensioned so that, after insertion, the cable cladding 13 is clamped between the recess 12a and the sleeve 6. In order to prevent the cable cladding 13 together with the sleeve from being pulled out, the recess 12a has a portion with a seating surface 17 which receives the flange with the flange supported against the surface 17 of the housing 12.

The housing 12 has two parts which meet on a parting plane which extends basically on the axis of the cable 103. Each of the parts is provided with recesses, such as the recesses having the seating surface 17, as mentioned hereinabove. In addition, each part has a recess with a seating surface 16 for receiving the clamping mechanism 101 of FIG. 2 and a recess have a seating surface 15 for receiving the winding and pinch mechanism 102. As illustrated in FIG. 9, the winding and pinch mechanism 102 will lie under retaining noses 14 in the housing part with the panel 9 and pinching member having one side lying against the seating surface 15. In this way, any tensile stresses applied to the reinforcement elements 11 will be transferred directly to the housing.

Although various minor modifications may be suggested by those versed in the art, it should be understood that I wish to embody within the scope of the patent granted hereon all such modifications as reasonably and properly come within the scope of my contribution to the art.

I claim:

1. In an apparatus for fixing light waveguide cables in a plug housing which comprises a through-opening for conducting at least one light waveguide cable through the housing, the improvements comprising first means for releasably holding and supporting a light waveguide cable jacket, second means for releasably holding and supporting reinforcing elements of the cable, third means for releasably holding and supporting at least one fiber-like light waveguide of the cable in a fixed direction in the housing, said second means including a plate for wrapping the reinforcement elements thereon and a pinch element coacting with said plate to clamp the wrapped elements on the plate, said housing being composed of at least two parts being separable on a parting plane extending parallel to the fixed direction of the light waveguide in the housing, said parts being provided with separate recesses for receiving and mounting each of the first, second and third means separately in the housing with the first, second and third means extending across the parting plane so that each of the first, second and third means can be separately manipulated within said housing.

2. In an apparatus according to claim 1, wherein the first means includes a hollow, cylindrical sleeve having a flange at one end, said sleeve being pushed under the cable jacket of the cable with the flange projecting from the end of the cable jacket.

3. In an apparatus according to claim 2, wherein the outer surface of the sleeve is provided with means to prevent sliding of the jacket therefrom.

4. In an apparatus according to claim 3, wherein said means for preventing sliding comprises groove-like teeth formed on the outer surface of the sleeve.

5. In an apparatus according to claim 3, wherein the housing parts have a recess for receiving said sleeve and flange, said recess having a surface provided with means for coacting with the means to prevent sliding to firmly grip the jacket onto the sleeve.

6. In an apparatus according to claim 2, wherein parts of the housing have a recess for receiving the sleeve and gripping the flange, said recess having a portion provided with means for gripping the outer surface of the jacket to prevent sliding from said sleeve.

7. In an apparatus according to claim 1, wherein the third means comprises a pair of identical members, each member having a groove coacting with a groove in the other member for gripping a waveguide of the cable, each of said members having a bore and a pin extending transverse to said grooves, said members being assembled with the pin of one member inserted in the bore of the other member and the grooves coacting to grip a fiber waveguide therein.

8. In an apparatus according to claim 7, wherein each of the bores has axially extending ribs coacting with the pin to form a press fit when the pin is inserted therein.

9. In an apparatus according to claim 7, wherein the first means includes a hollow, cylindrical sleeve having a flange at one end and an outer surface having groove-like teeth thereon, said sleeve being pushed under the cable jacket of the cable with the flange projecting from the end of the cable jacket and said teeth gripping an inner surface of the cable jacket.

10. In an apparatus for fixing light waveguide cables in a plug housing which comprises a through-opening for conducting at least one light waveguide cable through the housing, the improvements comprising first means including a sleeve member for releasably holding and supporting a light waveguide cable jacket, second means for releasably holding and supporting reinforcing elements of the cable, third means for releasably holding and supporting at least one fiber-like light waveguide of the cable in a fixed direction in the housing, said second means including a plate for wrapping the reinforcement elements thereon and a pinch element coacting with said plate to clamp the wrapped elements, said third means comprising a pair of identical members, each member having a flat surface with a transverse groove coacting with a groove in the other member for gripping a waveguide of the cable, each of said members having a bore and a pin extending transverse to said grooves and at a right angle to the flat surface, said members being assembled with the pin of one member inserted in the bore of the other member and the grooves of the member coacting to grip a fiber waveguide therein, said plug housing being composed of at least two parts separable on a parting plane extending parallel to the fixed direction of the light waveguide in the housing, said parts being provided with separate recesses for receiving and mounting the sleeve member of the first means, the plate and pinch element of the second means and the assembled members of the third means separately in the housing with the first, second and third means extending across the parting plane so that each of the first, second and third means can be separately manipulated within said housing.

* * * * *